United States Patent
Yakali (10) Patent No.: US 8,843,310 B2
(45) Date of Patent: Sep. 23, 2014

(54) NAVIGATION DEVICE COMMUNICATIONS WITH POINTS OF INTEREST AND UPDATE METHOD

(75) Inventor: Hakan Yakali, Amstelveen (NL)

(73) Assignee: TomTom International B.V., Amsterdam (NL)

( * ) Notice: Subject to any disclaimer, the term of this patent is extended or adjusted under 35 U.S.C. 154(b) by 218 days.

(21) Appl. No.: 13/383,258

(22) PCT Filed: Jul. 10, 2009

(86) PCT No.: PCT/EP2009/058831
§ 371 (c)(1),
(2), (4) Date: Jul. 6, 2012

(87) PCT Pub. No.: WO2011/003466
PCT Pub. Date: Jan. 13, 2011

(65) Prior Publication Data
US 2012/0265438 A1    Oct. 18, 2012

(51) Int. Cl.
*G01C 21/32* (2006.01)
*G01C 21/34* (2006.01)

(52) U.S. Cl.
CPC .................................. *G01C 21/3476* (2013.01)
USPC ............................. 701/454; 701/409; 701/438

(58) Field of Classification Search
CPC .................................................. G01C 21/3476
See application file for complete search history.

(56) References Cited

U.S. PATENT DOCUMENTS

| | | | |
|---|---|---|---|
| 7,257,485 B2 * | 8/2007 | Sumizawa et al. | 701/454 |
| 2003/0221122 A1 * | 11/2003 | Hatori | 713/200 |
| 2005/0137790 A1 * | 6/2005 | Yamada et al. | 701/202 |
| 2007/0106467 A1 * | 5/2007 | Sumizawa et al. | 701/209 |
| 2007/0203642 A1 * | 8/2007 | Arnold-Huyser | 701/211 |
| 2008/0059057 A1 * | 3/2008 | Tengler et al. | 701/204 |
| 2010/0195632 A1 * | 8/2010 | Prabhu | 370/338 |
| 2010/0205021 A1 * | 8/2010 | Jewett et al. | 705/7 |
| 2011/0106438 A1 * | 5/2011 | Morley | 701/207 |
| 2011/0144902 A1 * | 6/2011 | Forte et al. | 701/201 |
| 2012/0029817 A1 * | 2/2012 | Khorashadi et al. | 701/451 |

(Continued)

FOREIGN PATENT DOCUMENTS

| | | | |
|---|---|---|---|
| EP | 1544574 A1 | 6/2005 | |
| JP | 2004286460 A | 10/2004 | |
| JP | 2006145482 A | 6/2006 | |

OTHER PUBLICATIONS

International Search Report issued Apr. 6, 2010 for International Application No. PCT/EP2009/058831.

*Primary Examiner* — Calvin Cheung
*Assistant Examiner* — Krishnan Ramesh (57) ABSTRACT

This invention relates to a navigation device (200) comprising: a processor (210) for generating, from map data, a digital map for display to a user; a store (230) for said map data and data defining the location of points of interest on said digital map; and a display (240) for displaying said digital map to said user; characterised in that the navigation device (200) further comprises: a short-range radio transceiver (265) for receiving signals from and transmitting signals to computer systems that are each associated with a respective point of interest; and a wireless network control module (490) that is configured to energise said short-range radio transceiver (265) for the exchange of signals if a determined current location of said navigation device (200) is within wireless communications range of a point of interest. A method is also disclosed.

14 Claims, 4 Drawing Sheets

(56) References Cited

U.S. PATENT DOCUMENTS

| | | | |
|---|---|---|---|
| 2012/0123670 A1* | 5/2012 | Uyeki | 701/300 |
| 2012/0166836 A1* | 6/2012 | Hardman et al. | 713/320 |
| 2013/0031121 A1* | 1/2013 | Sera et al. | 707/758 |
| 2013/0059538 A1* | 3/2013 | King, II | 455/41.2 |
| 2013/0157722 A1* | 6/2013 | Kim et al. | 455/566 |
| 2013/0275368 A1* | 10/2013 | Camacho et al. | 707/609 |

* cited by examiner

NAVIGATION DEVICE COMMUNICATIONS WITH POINTS OF INTEREST AND UPDATE METHOD

This application is the National Stage of International Application No. PCT/EP2009/058831, filed date 10 Jul. 2009, and designating the United States. The entire contents of this application is incorporated herein by reference.

FIELD OF THE INVENTION

This invention relates to navigation devices. Illustrative embodiments of the invention relate to portable navigation devices (so-called PNDs), in particular PNDs that include Global Positioning System (GPS) signal reception and processing functionality. Other embodiments relate, to navigation devices that are built-into vehicles, and yet further embodiments relate to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile (e.g. RAM) and non-volatile (e.g. ROM), and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons and a microphone for detecting user speech. The buttons may be configured, for example, to power the PND on or off or to control operation or other features of the device and need not necessarily be on the PND itself but could be on a steering wheel or another part of the vehicle in circumstances where the device is built into a vehicle. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks. PND devices of this type also typically include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle. In addition, the functionality of PNDs may be embodied in a navigation device that is built into a vehicle, for example as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location on the map, and it is usual for the icon to be centred with on the map to provide a good view of roads in the vicinity of the current device location. Icons representing the location of other points of interest (such as petrol stations, airports, recreation facilities and such like) on the map may also be displayed. Additionally, navigation information may be displayed, optionally in a status bar above, below or to one side of the displayed map information, examples of navigation information include a distance to the next manoeuvre that a user is required to take to continue along a calculated route, the nature of that manoeuvre possibly being represented by a further icon suggestive of the particular type of manoeuvre, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user should deviate from a previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Navigation devices such as the TomTom 720T model PND manufactured and supplied by TomTom International B.V., and the Carminat TomTom system that is available as a built-in component of Renault vehicles, each provide a reliable means for enabling users to navigate from one position to another—although the accuracy of any given calculated route will depend to some extent on the accuracy of the data stored in the device on which the route calculation is based.

In general terms, map data tends to change relatively slowly over time as new roads are built, and as such it is reasonably likely that newly obtained map data will remain current for a reasonable amount of time.

However, as other types of data are included in the route calculation process, so the efficacy of a given calculated route becomes more dependent on the accuracy of the data stored in the device. For example, some navigation devices permit routes to be calculated using information concerning currently prevailing traffic congestion, but as this information changes rapidly the accuracy and/or efficacy of a given calculated route will vary significantly over time. As an illustration, it is immediately apparent that a route through a city centre which was calculated on the basis of traffic congestion at 9.00 am may well not be the best route later on in the day.

To this end it is advisable for the data stored in the navigation device to be regularly updated, and in general terms it is true to say that the more volatile the data used to calculate a route, the more important it becomes to update the data stored in the device.

Portable navigation devices are currently updated either by plugging the device into a computer and downloading updates to the device via the internet, or by updating the device wirelessly over the mobile telephone network. For navigation devices that are permanently built-into a vehicle, the data stored on the device can typically be updated by downloading updates onto a suitable data storage device and then uploading that data from the storage device to the navigation device, or again by downloading data to the navigation device over the mobile telephone network.

Downloading data to a PND via the internet, and uploading data from a storage device to a built-in navigation device each take some time and can therefore be inconvenient for some users. Downloading data to a navigation device via the mobile telephone network is relatively slow, and hence is not a viable solution for large amounts of data (such as a new digital map). Downloading data over a mobile network can also incur considerable charges if the user is not a subscriber to an all-inclusive data plan.

It would be advantageous, therefore, if a means could be devised whereby the content of navigation devices could be easily, inexpensively and quickly be updated.

SUMMARY OF THE INVENTION

In pursuit of this aim, a presently preferred embodiment of the present invention provides a navigation device comprising: a processor for generating, from map data, a digital map for display to a user; a store for said map data and data defining the location of points of interest on said digital map; and a display for displaying said digital map to said user; characterised in that the navigation device further comprises: a short-range radio transceiver for receiving signals from and transmitting signals to computer systems that are each associated with a respective point of interest; and a wireless network control module that is configured to energise said short-range radio transceiver for the exchange of signals if a determined current location of said navigation device is within wireless communications range of a point of interest.

Another embodiment of the present invention relates to a method for downloading content to a navigation device, the method comprising: determining the location of the navigation device; determining the location of a point of interest that is associated with a computer system that is capable of communicating wirelessly with a navigation device; and energising a short-range radio transceiver of said navigation device for the exchange of signals with said computer system when a current location of said navigation device is within wireless communications range of said point of interest.

Yet another embodiment of the present invention relates to computer software comprising one or more software modules operable, when executed in an execution environment, to cause a processor of a navigation device to: determine a current location of the navigation device; determine a location of a point of interest that is associated with a computer system that is capable of communicating wirelessly with a navigation device; and energise a short-range radio transceiver of said navigation device for the exchange of signals with said computer system when said current location of said navigation device is within wireless communications range of said point of interest.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a navigation device that is permanently installed in a vehicle, such as the aforementioned Carminat TomTom system. It should be remembered, however, that the teachings of the present invention are not limited to such devices but are instead applicable to PNDs and any other type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
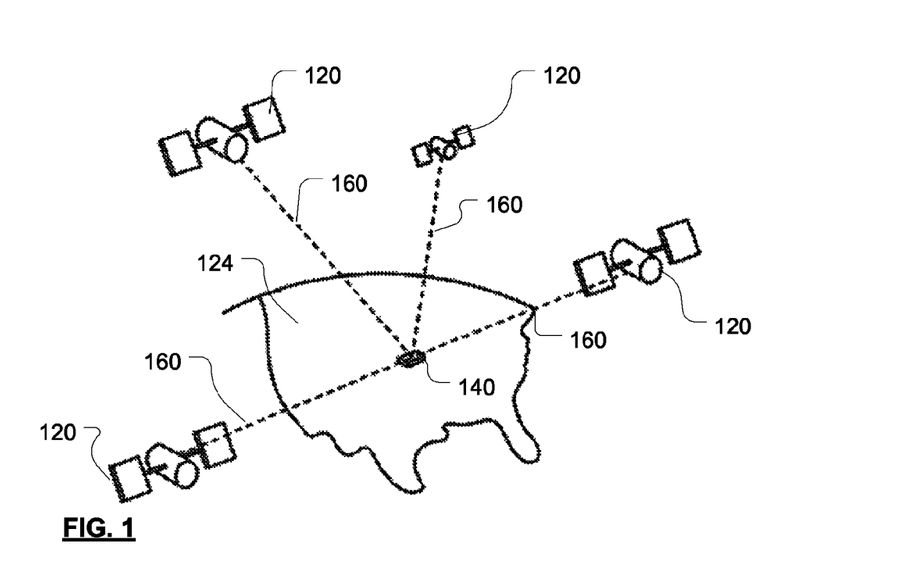
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
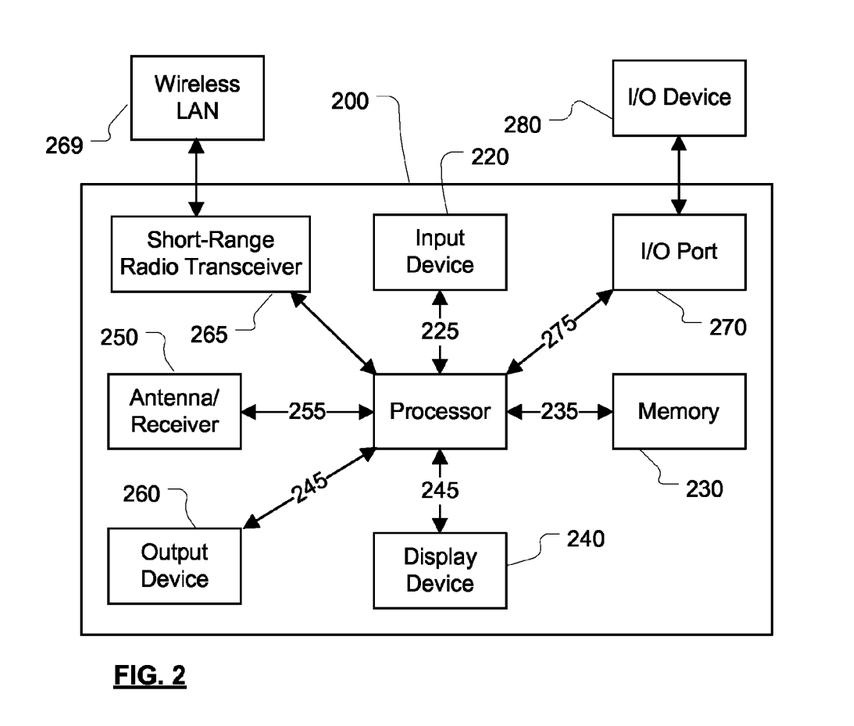
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 includes a processor 210 connected to an input device 220 and a display screen 240. The input device 220 can include a keyboard device, voice input device, touch panel and/or any other input device that can be utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

In another envisaged implementation the input device may comprise or include controls of the vehicle that may have functions other than those associated with the navigation device. For example, the input device could comprise buttons on the steering wheel of the vehicle that perform one function when the user is controlling the vehicle entertainment system—for example—and another function when the user is controlling the navigation device.

The navigation device may include an output device 260, for example an audible output device (e.g. a loudspeaker). As output device 260 can produce audible information for a user of the navigation device 200, it is should equally be understood that input device 240 can include a microphone for receiving input voice commands, and software for interpreting voice commands and converting them to machine comprehensible instructions.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

As will be understood by one of ordinary skill in the art, the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like.

In addition, the navigation device 200 of FIG. 2 when embodied as a portable device can be mounted or "docked" in a known manner in or on a vehicle such as a bicycle, a motorbike, a car or a boat for example. Such a navigation device 200 is then removable from the docked location for portable or handheld navigation use.

The navigation device of the present invention further comprises a short range radio transceiver 265, such as a wireless LAN, Wi-Fi or WIMAX compatible transceiver, that is configured to enable the navigation device to establish wireless communications with other short-range radio networks, such as wireless LAN 269.

Figure 3:
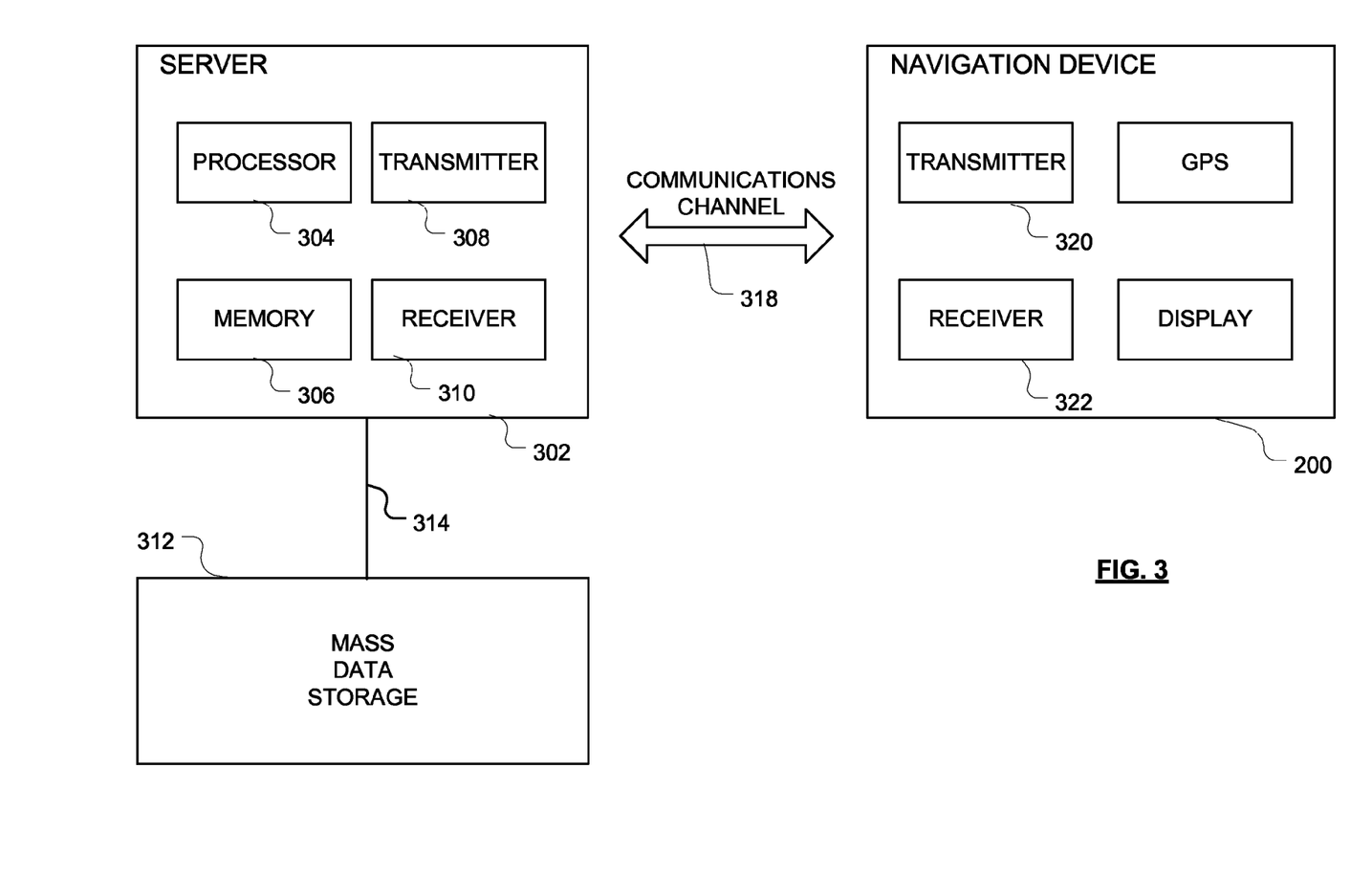
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection can be established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection.

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As aforementioned in connection with FIG. 2, the navigation device 200 includes a processor 210, an input device 220, and a display screen 240. In a preferred arrangement the input device 220 and display screen 240 may be integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
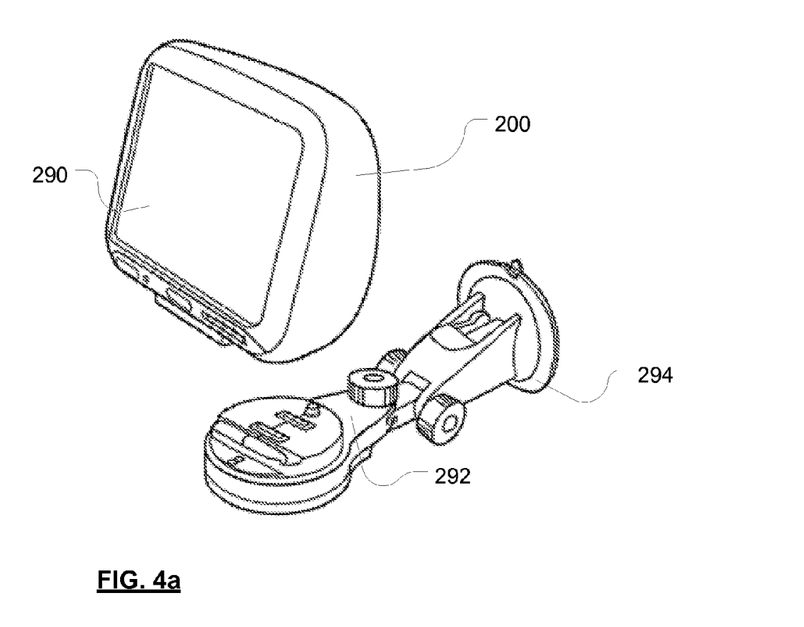
FIGS. 4A and 4B are illustrative perspective views of a navigation device.

FIGS. 4A and 4B are perspective views of a navigation device 200 that is embodied as a PND. As shown in FIG. 4A, the PND includes an integrated input and display device 290 (a touch panel screen for example) and the other components of FIG. 2 (including but not limited to internal GPS receiver 250, microprocessor 210, a power supply, memory systems 230, etc.).

The PND 200 may sit on an arm 292, which itself may be secured to a vehicle dashboard/window/etc. using a suction cup 294. This arm 292 is one example of a docking station to which the PND 200 can be docked.

Figure 4B:
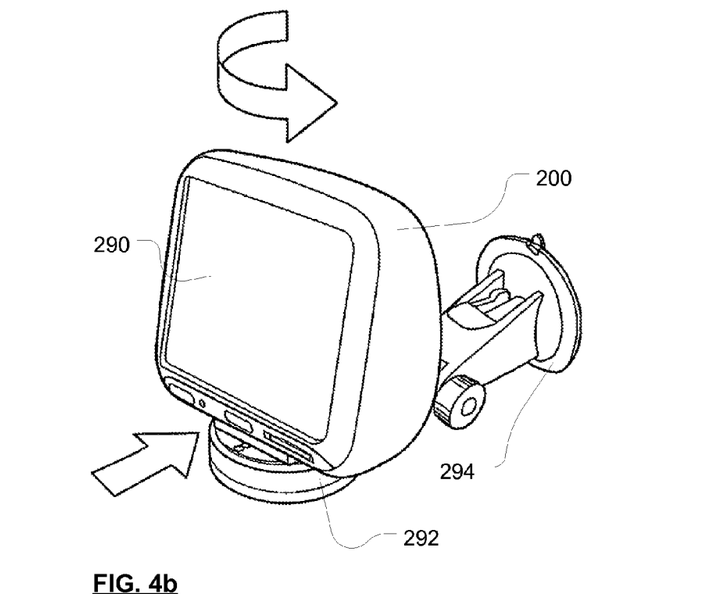

As shown in FIG. 4B, the PND 200 can be docked or otherwise connected to an arm 292 of the docking station by snap connecting the PND 292 to the arm 292 for example. The PND 200 may then be rotatable on the arm 292, as shown by the arrow of FIG. 4B. To release the connection between the PND 200 and the docking station, a button on the navigation device 200 may be pressed, for example. Other equally suitable arrangements for coupling and decoupling the navigation device to a docking station are well known to persons of ordinary skill in the art.

As is well understood, navigation devices of the type aforementioned are provided with map data, and the processor is operable to generate a digital map from this data for display on the display of the navigation device. The navigation device is also provided with a database of points of interest, which can be displayed on the digital map, and the device is further able to compute navigation routes to selected destinations, optionally using real-time or near real-time traffic congestion data and/or user submitted map data updates (e.g. TomTom Map Share updates) to calculate the best route given the prevailing traffic conditions and state of the road network.

This functionality works extremely well, but for a user to make best use of it they do need to update it regularly. Some users do not have data contracts to enable data download over the mobile telephone network, and other users are not prepared to take the time to update their devices.

For these users the map data stored in their navigation devices can quickly go "stale", and the efficacy of calculated routes is likely to decrease. To address this, the teachings of the present invention propose to provide another mechanism for updating data stored in the navigation device and/or for downloading new data to the navigation device that avoids the cost associated with mobile networks, and frees the user from having to manually download an install updates for the device.

To this end in one envisaged implementation the navigation device may be provided with an enhanced database of points of interest, wherein points of interest that have a short-range wireless network installed are flagged. Such points of interest could comprise, for example, petrol filling stations that have been provided with a computer that is coupled to the internet (for example by means of a simple Ethernet interface) and includes equipment to establish a local wireless LAN, for example a WiFi or WIMAX network, to which navigation devices can connect using the aforementioned short-range radio transceiver 265.

When the navigation device is in range of the network and has connected thereto, the navigation device can download map updates, Map Share information, current traffic congestion information (such as HD Traffic information) or other information such as merchandising or advertising information.

The advantages of such an arrangement are several. In the first instance, this arrangement avoids data transmission via the mobile telephone network and hence avoids the charges that such transmissions can sometimes accrue. In the second instance, data transmission via a short-range network is much faster than via the mobile telephone network, and as such more information can be transferred in a shorter period of time. In the third instance, as users no longer can automatically download information to their navigation devices those users who are reluctant to manually update their devices are freed from having to do so. Finally, in the fourth instance, such an arrangement helps lighten the load on the servers of the organisation providing map data in that users have many more locations from which data can be downloaded, rather than only the one location characteristic of current systems.

The teachings of the present invention may be implemented in a number of ways. In a first illustrative arrangement, the navigation device may be configured—once a route has been calculated—to identify points of interest along the calculated route that have an installed short-range network, to switch on the short-range radio transceiver 265 of the navigation device when the computed current location of the device is within range of a given point of interest's network, and to switch off the short-range radio transceiver 265 when the computed current location of the device indicates that it has moved out of range of the point of interest's network.

In another envisaged implementation, of particular use when the navigation device is used in a free driving mode (that is to say, a mode where a digital map of the local area is displayed without the user having opted to navigate to a particular destination), the navigation device may be configured to periodically determine whether the computed current location of the navigation device is within range of a point of interest that is provided with a wireless network, to switch on the short-range radio transceiver 265 to download data if the navigation device should be determined to be within range of such a network, and to switch off the short-range radio transceiver 265 once the navigation device is determined to have moved out of range of the network.

One anticipated drawback of these arrangements is that the short-range radio transceiver 265 may be quickly switched on and off if the vehicle is travelling at speed through the wireless network of a given point of interest, and to avoid this the navigation device may be configured to only enable the short-range radio transceiver for the download of data when the when the navigation device has been stationary within range of a given wireless network for a given period of time.

In another envisaged implementation the navigation device may not include information as to whether a given point of interest has or has not an installed short-range network, and the navigation device may simply be configured to switch on the short-range radio transceiver when in range of a given type or types of points of interest. As before, in this arrangement the device may need to be stationary for a given period of time before the transceiver is energised.

In the preferred arrangement this functionality is implemented in software, illustrative components of which will now be described.

Figure 5:
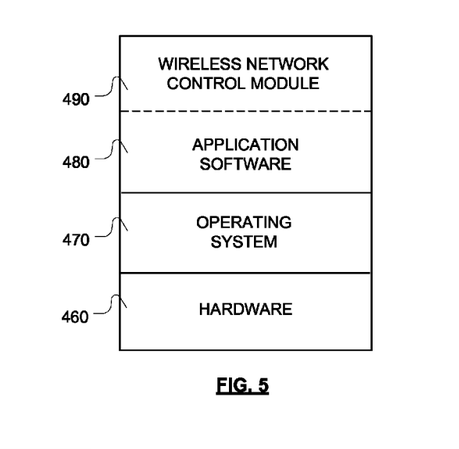
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a wireless network control module 490, the function of which will now be described in detail in connection with FIG. 6.

Figure 6:
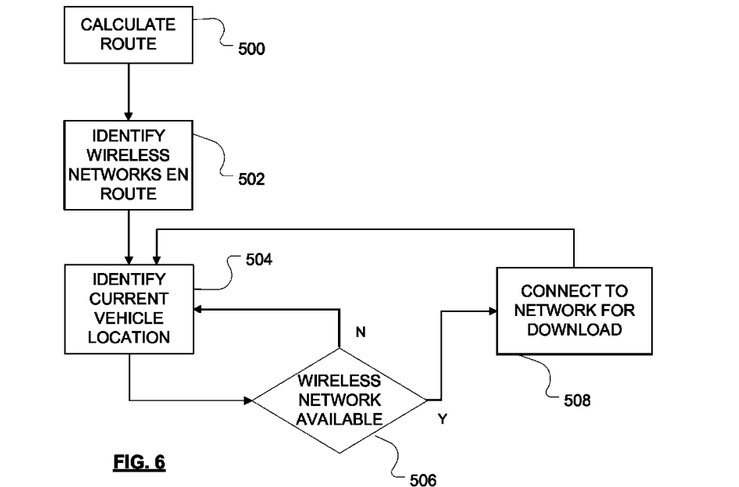
FIG. 6 is an illustrative flow diagram depicting the steps of one method by which the teachings of the present invention may be implemented.

FIG. 6 is a schematic flow diagram illustrating steps of one method by which the teachings of the present invention, in particular the functionality of the aforementioned wireless network control module, may be implemented. As shown, in step 500 the user controls the navigation device to calculate a route to a selected destination. The wireless network control module 490 then interrogates the points of interest database stored in the navigation device in step 502 to identify points of interest on the calculated route that have an installed wireless network.

As the user travels along the calculated route, the wireless network control module 490 identifies the current vehicle position in step 504 and determines in step 506 whether the current location is one at which a wireless network is available. If the current location of the vehicle is within range of a wireless network previously identified in step 502, the wireless network control module 490 switches on the short-range wireless transceiver 265 and connects to the wireless network for data download.

As aforementioned, this process can be modified so that the wireless network control module only proceeds to step 508 if the navigation device has been stationary for at least a predetermined period of time.

In an alternative implementation of particular utility in a free-driving mode, the functionality provided by the wireless network control module 490 is similar to that shown in FIG. 6, the chief differences being that steps 500 and 502 are not required, and that in step 506 the wireless network control module 490 determines whether the current vehicle position falls within range of a wireless network enabled point of interest.

It will be apparent from the foregoing that the teachings of the present invention provide an effective means for addressing the problems mentioned hereinbefore.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

In another modification, the navigation device may be configured to communicate with point of interest computer systems using a different type of communications interface, and as such the scope of the present invention should not be read as being limited to wireless LAN communication with point of interest computer systems.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A navigation device comprising:
   a processor for generating, from map data, a digital map for the display to a user;
   a store for said map data and data defining the location of points of interest on said digital map;
   a display for displaying said digital map to said user;
   a short-range radio transceiver for receiving signals from and transmitting signals to computer systems that are each associated with a respective point of interest; and
   a wireless network control module that is configured to energize said short-range radio transceiver for the exchange of signals having determined a current location of said navigation device is within wireless communications range of a point of interest, wherein the wireless network control module is configured to:
   interrogate a database for points of interest and energizing said short-range radio transceiver having determined the current location of said navigation device is within wireless communications range of the point of interest,
   wherein said interrogated database results in no information for the point of interest, energizing said short-range radio transceiver as said short-range radio transceiver is within wireless communications range of a point of interest of a predetermined type, and
   connect to a computer system only having determined the navigation device has been stationary for at least a predetermined period of time.

2. The navigation device according to claim 1, wherein the wireless network control module is configured to energize said short-range radio transceiver for the exchange of signals having determined the current location of said navigation device is within wireless communications range of the point of interest that has said computer system associated with it.

3. The navigation device according to claim 2, wherein the processor is operable to compute a route from the current location of the navigation device to a closest point of interest that is associated with a received status signal.

4. The navigation device according to claim 3, wherein the processor is configured to generate navigation instructions for relaying to said user to guide said user along said route to said closest point of interest.

5. The navigation device according to claim 1, wherein said navigation device is permanently mounted in a vehicle.

6. The navigation device according to claim 1, wherein said navigation device comprises a Portable Navigation Device (PND) this is removable from a vehicle.

7. The navigation device according to claim 1, wherein said exchange of signals comprises a download of information from said computer system to said navigation device.

8. The navigation device according to claim 7, wherein said download of information comprises information to update previously stored information in said navigation device.

9. The navigation device according to claim 7, wherein the information comprises current traffic congestion information.

10. The navigation device according to claim 7, wherein the information comprises merchandising or advertising information.

11. The navigation device according to claim 1, wherein said short-range radio transceiver is configured to be capable of wireless LAN communications with said computer system.

12. The navigation device according to claim 11, wherein said short-range radio transceiver is configured to be capable of WiFi or WIMAX compatible communications.

13. A method for downloading content to a navigation device, the method comprising:
   determining, by a processor, the location of the navigation device;
   determining the location of a point of interest that is associated with a computer system that is capable of communicating wirelessly with a navigation device; and
   energizing, by a wireless network control module, a short-range radio transceiver of said navigation device for the exchange of signals with said computer system having determined a current location of said navigation device is within wireless communications range of said point of interest, wherein
   the wireless network control module is further configured to:
   interrogate a database for points of interest and energizing said short-range radio transceiver having determined the current location of said navigation device is within wireless communications range of the point of interest,
   wherein said interrogated database results in no information for the point of interest, energizing said short-range radio transceiver as said short-range radio transceiver is within wireless communications range of a point of interest of a predetermined type, and
   connect to the computer system only having determined the navigation device has been stationary for at least a predetermined period of time.

14. A non-transitory computer software element embodied on a computer readable media comprising one or more software modules operable, upon being executed in an execution environment, to cause a processor of a navigation device to:
   determine a current location of the navigation device;
   determine a location of a point of interest that is associated with a computer system that is capable of communicating wirelessly with the navigation device; and
   energize, by a wireless network control module, a short-range radio transceiver of said navigation device for the exchange of signals with said computer system having determined said current location of said navigation device is within wireless communications range of said point of interest, wherein
   the wireless network control module is further configured to:
   interrogate a database for points of interest and energizing said short-range radio transceiver having determined the current location of said navigation device is within wireless communications range of the point of interest,
   wherein said interrogated database results in no information for the point of interest, energizing said short-range radio transceiver as said short-range radio transceiver is within wireless communications range of a point of interest of a predetermined type, and
   connect to the computer system only having determined the navigation device has been stationary for at least a predetermined period of time.

* * * * *